(12) United States Patent
Zimmer et al.

(10) Patent No.: US 7,640,553 B2
(45) Date of Patent: Dec. 29, 2009

(54) MECHANISMS TO SUPPORT USE OF SOFTWARE RUNNING ON PLATFORM HARDWARE EMPLOYING DIFFERENT ENDIANNESS

(75) Inventors: Vincent J. Zimmer, Federal Way, WA (US); Michael A. Rothman, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 886 days.

(21) Appl. No.: 11/240,278

(22) Filed: Sep. 30, 2005

(65) Prior Publication Data

US 2007/0079295 A1    Apr. 5, 2007

(51) Int. Cl.
G06F 3/00     (2006.01)
G06F 9/44     (2006.01)
G06F 13/00    (2006.01)
G06F 12/00    (2006.01)
G06F 15/177   (2006.01)

(52) U.S. Cl. .................. 719/321; 711/202; 711/217; 713/1; 713/2; 713/100

(58) Field of Classification Search ............. 719/321, 719/328; 713/1–2, 100; 711/202, 217
See application file for complete search history.

(56) References Cited

U.S. PATENT DOCUMENTS

| | | | | |
|---|---|---|---|---|
| 5,408,664 A | * | 4/1995 | Zarrin et al. ............ | 713/2 |
| 5,613,090 A | * | 3/1997 | Willems ............... | 719/329 |
| 5,781,763 A | * | 7/1998 | Beukema et al. ....... | 710/22 |
| 5,828,853 A | * | 10/1998 | Regal .................. | 710/315 |
| 5,867,690 A | * | 2/1999 | Lee et al. ............. | 710/65 |
| 5,898,896 A | * | 4/1999 | Kaiser et al. .......... | 710/65 |
| 5,928,349 A | * | 7/1999 | Loen et al. ........... | 712/1 |
| 5,937,170 A | * | 8/1999 | Bedarida .............. | 710/100 |
| 6,021,275 A | * | 2/2000 | Horwat ............... | 717/159 |
| 6,202,146 B1 | * | 3/2001 | Slaughter et al. ...... | 713/1 |
| 6,388,586 B1 | * | 5/2002 | Fischer et al. ......... | 341/51 |
| 6,895,489 B2 | * | 5/2005 | Qureshi et al. ........ | 711/202 |
| 7,243,353 B2 | * | 7/2007 | Zimmer et al. ........ | 719/310 |
| 2004/0059848 A1 | * | 3/2004 | Chang et al. .......... | 710/65 |
| 2006/0195630 A1 | * | 8/2006 | Walters et al. ......... | 710/30 |

* cited by examiner

*Primary Examiner*—Hyung S Sough
*Assistant Examiner*—Qing-Yuan Wu
(74) *Attorney, Agent, or Firm*—Blakely, Sokoloff, Taylor & Zafman LLP

(57) ABSTRACT

Methods, software/firmware, and apparatus to support use of software running on platform hardware employing different endianness. In one embodiment, an endian byte order shim is implemented in a firmware stack to facilitate the use of software running on a computer platform having a processor employing an endianness that is different from the endianness native to the software. In response to software calls into the firmware, the endian byte order shim converts the endian byte order of the call arguments, as necessary, and passes the converted arguments to the firmware. Similarly, return arguments generated via the firmware (and/or platform hardware) are converted back to the endian byte order native to the software prior to being returned to the software.

15 Claims, 10 Drawing Sheets

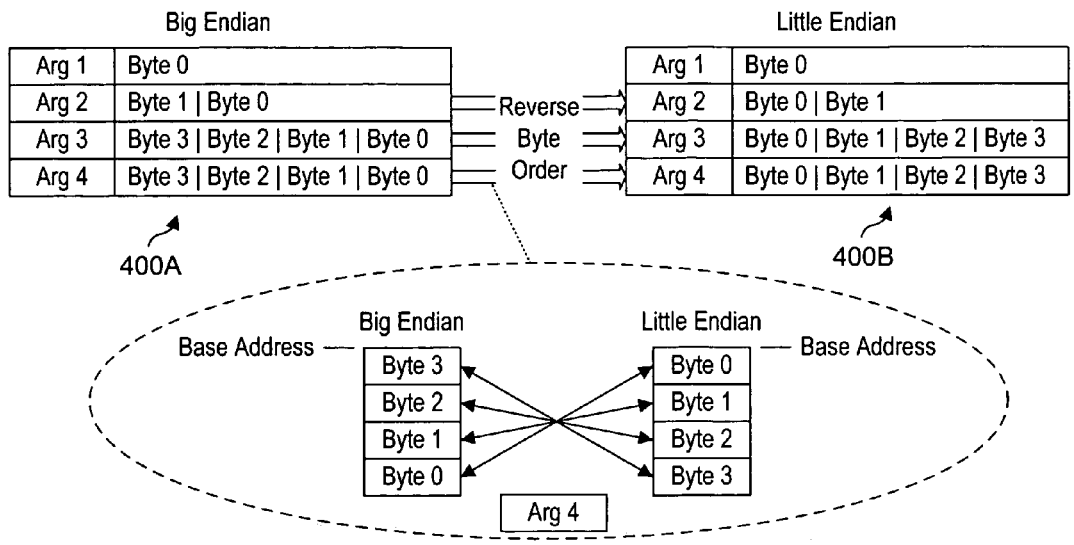
*Fig. 4*
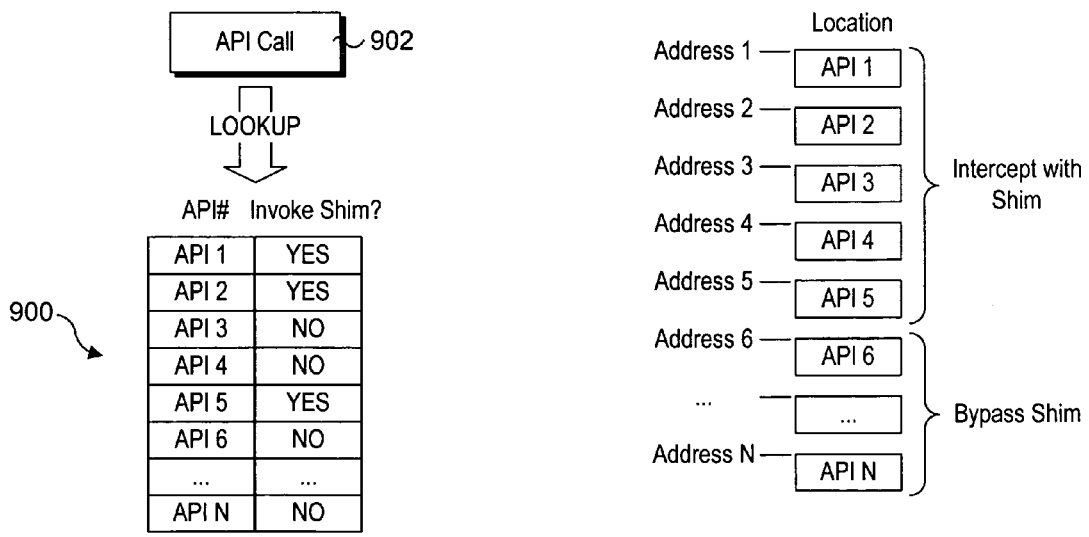
*Fig. 9*          *Fig. 10*

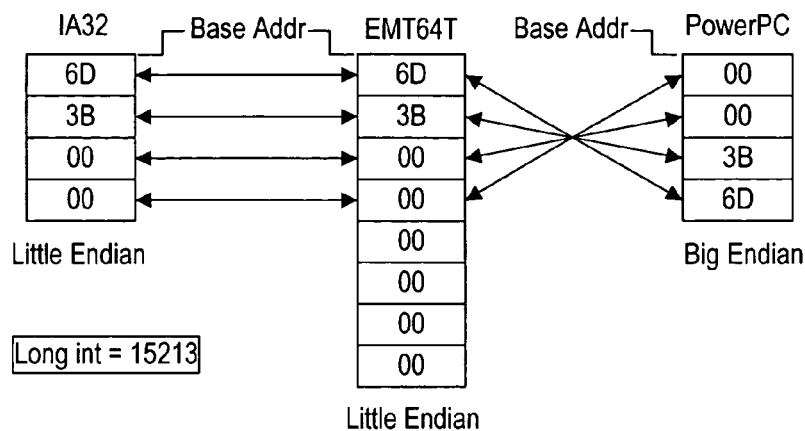
Fig. 5
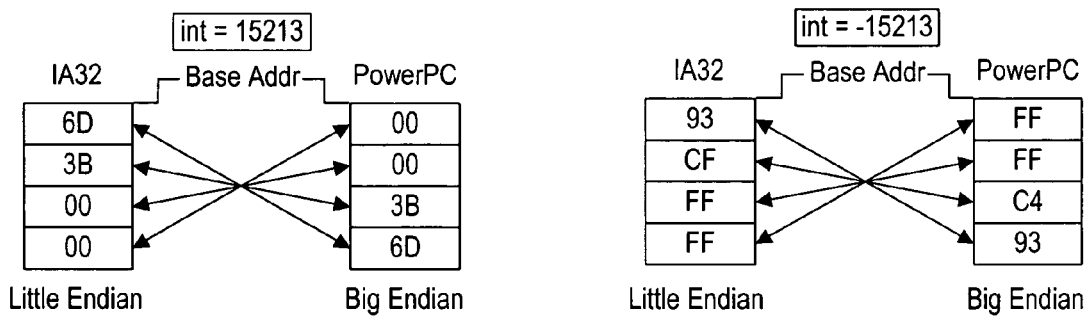
Fig. 6a  Fig. 6b

MECHANISMS TO SUPPORT USE OF SOFTWARE RUNNING ON PLATFORM HARDWARE EMPLOYING DIFFERENT ENDIANNESS

FIELD OF THE INVENTION

The field of invention relates generally to computer systems and, more specifically but not exclusively relates to techniques for supporting little and big endian-based software on the same platform.

BACKGROUND INFORMATION

Endianness is an arbitrary convention of byte order, required when integers or any other data are represented with multiple bytes. For example, integers larger than 255 require at least two bytes of storage. Similar, text strings encoded in unicode UTF-16 or UTF-32 respectively require two bytes and four bytes of storage for each character. In such situations, there are different ways those bytes can be arranged in memory or in transmission over some medium. By convention, the two orders are called "Little Endian" and "Big Endian".

"Little Endian" means that the low-order byte (the least significant byte or LSB) of the number is stored in memory at the lowest address, and the high-order byte (most significant bit or MSB) at the highest address. (Thus, the little end comes first.) For example, a 4 byte LongInt (long integer) comprising:

Byte3 Byte2 Byte1 Byte0 will be arranged in memory as follows:

| Base Address+0 | Byte0 |
| Base Address+1 | Byte1 |
| Base Address+2 | Byte2 |
| Base Address+3 | Byte3 |

Processors employing Intel's® ubiquitous IA32 architecture (the processors employed in most personal computers, notebooks, servers, etc.) use "Little Endian" byte order.

"Big Endian" means that the high-order byte of the number is stored in memory at the lowest address, and the low-order byte at the highest address. (The big end comes first.) The previous 4-byte LongInt would then be stored as:

| Base Address+0 | Byte3 |
| Base Address+1 | Byte2 |
| Base Address+2 | Byte1 |
| Base Address+3 | Byte0 |

Motorola® processors and IBM® PowerPC™ processors, such as those employed in Apple® Macintosh™ computers, and Sun® SPARC™ processors use "Big Endian" byte order, among others.

Some processor architectures can be configured to operate in either little-endian or big-endian mode. These include Intel® processors having the IA64 architecture (e.g., Itanium®), ARM DEC Alpha, MIPS, PA-RISC and some IBM PowerPC® processor architectures. Such processors are called "bi-endian," which denotes the capability to be configured to pass and store data in either big-endian or little-endian format.

Endianness has significant implications on software portability. For example, in interpreting data stored in binary format and using an appropriate bitmask, the endianness is important because different endianness will lead to different results from the mask. Additionally, proper endianness needs to be considered when writing binary data from software to a common format. For instance, saving data in the BMP bitmap format requires little endian integers—if the data are stored using big-endian integers then the data will be corrupted since they do not match the format. There are many other standard formats the employ specific endianness in a similar manner.

Usually, the problem with endianness can be easily dealt with at the application or operating system level. For example, endianness specified within a standard format is handled by merely adhering to the standard. Similarly, endianness within an application is typically self-contained, meaning that since that application is the only one dealing with the data, as long as the application is self-consistent with respect to endianness, there will be no problem, regardless of the native endian mode of the underlying processor.

The situation gets a little more difficult at the operating system (OS) level. Since an operating system has to "host" multiple applications, potentially having different endianness, the OS needs to provide a measure of consistency. This is generally handled by using application program interfaces (API's) with pre-defined endianness. Typically, the endianness employed by the OS will be in accordance with the underlying platform architecture the OS is ported to. Thus, an OS will be configured to operate using little endian byte order for processors that default to a corresponding little-endian mode (e.g., Microsoft Windows® on IA32 processors). Similarly, an OS will be configured to operate using big endian byte order for processors that default to a corresponding big-endian mode e.g., Mac OS X running on a Motorola Power Mac "G4" processor or IBM PowerPC "G5" processor.

The foregoing endian-specific operating systems create a problem for the platform vendor, particularly with respect to platform firmware. From the vendor's viewpoint, it would be advantageous to provide a single platform architecture that supports multiple operating systems in their native endian format. However, since current platform firmware is designed to operate in compliance with the processor architecture employed by the underlying platform processor(s), separate portings of operating systems are required to operate on endian-specific platforms.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4 is a schematic diagram illustrating the conversion of arguments in a stack that are passed to a firmware API using an endian byte order shim;

FIG. 5 is a schematic diagram illustrating the conversion of an exemplary data value between an exemplary set of processors;

FIGS. 6a and 6b illustrate exemplary byte order conversions between an IA32 architecture processor and a PowerPC processor;

FIG. 9 illustrates a mechanism employing a firmware API-to-endian byte order shim mapping that is used to determine whether an endian byte order shim is to be employed for a given firmware API call, according to one embodiment of the invention;

FIG. 10 illustrates a mechanism for determining whether an endian byte order shim is to be employed for a given firmware API call based on the address range at which the API is located.

DETAILED DESCRIPTION

Embodiments of methods, software (firmware), and apparatus for supporting little and big endian-based software on the same platform are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIGS. 1a-b and 2a-b illustrate embodiments of system and firmware architectures that support the use of both big-endian and little-endian software on the same platform, in accordance with principles disclosed herein. In general, the software and platform hardware components illustrated in the figures represent conventional components. Furthermore, in some embodiments, bi-endian software uses are supported without having to make any changes to software and platform hardware components. Rather, the mechanisms for providing this advantageous functionality are implemented via the platform firmware.

Figure 1A:
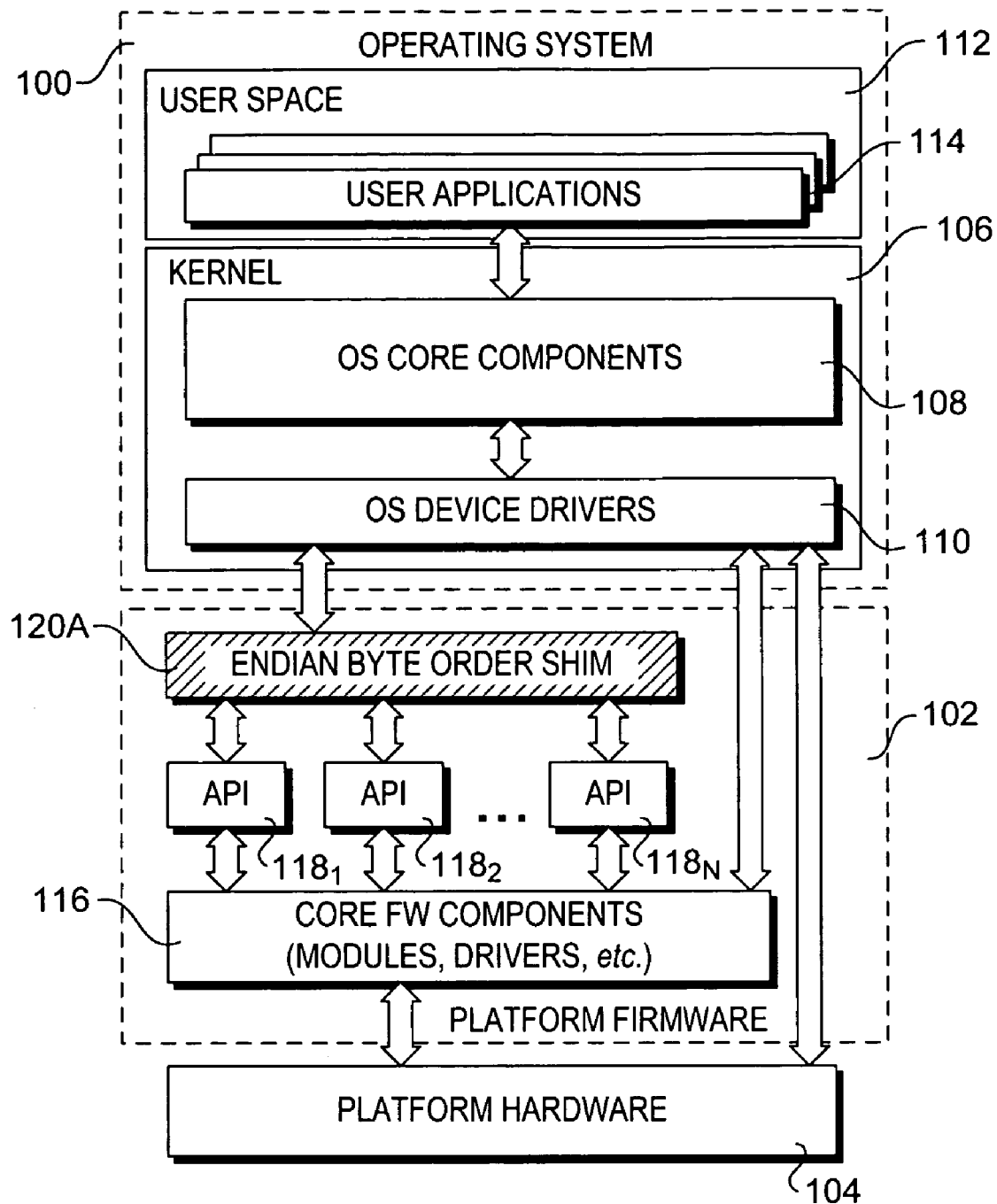
FIGS. 1a and 1b are schematic block diagrams illustrating respective embodiments of firmware architectures employing an endian byte order shim that sits between an OS device driver layer and a firmware API layer.

As shown in FIG. 1a, the processing stack includes an operating system 100 and firmware 102 running on platform hardware 104. The operating system comprises an OS kernel 106 including OS core components 108 and OS device drivers 110, and a user space 112 in which user applications 114 are run. Platform firmware 102 includes core firmware components 116 (e.g., firmware modules, drivers, etc.), APIs $118^{1-N}$, and an endian byte order "shim" 120A.

As described in further detail below, the endian byte order shims employed herein comprise an abstraction layer that facilitates endian consistency across its interfacing components. As illustrated in FIG. 1a, endian byte order shim 120A sits between OS device drivers 110 and APIs $118_{1-N}$. In some embodiments, the endian byte order shims are transparent to the interfaces (e.g., OS device drivers 110 and APIs $118_{1-N}$ for endian byte order shim 120A) to which it receives and passes data, such that the interfaces are unaware of a shim's existence (i.e., the shim appears "transparent"). Accordingly, the interfaces may be configured in their conventional manner, as if the endian byte order shim does not exist.

As shown in FIG. 1a, OS device drivers 110 may access platform hardware 104 in one or more of three manners. In accordance with modern extensible firmware architectures, such as the EFI firmware framework described below, APIs are "published" during platform initialization such that the run-time OS may access various firmware services and drivers, which, in turn, perform as a proxy for accessing the underlying platform hardware. In view of the system architecture illustrated in FIG. 1a, these components are depicted as APIs $118_{1-N}$ and core firmware components 114. In some instances, the OS device drivers may directly access selected core firmware components, such as legacy device drivers and the like. In some other cases, the OS device drivers may directly access platform hardware 104.

In general, the term "access" used herein concerns interacting with a component in order to either exchange data with the component (either a one-way or bi-directional data exchange), or provide instructions or a command to a component to perform a corresponding operation. For example, both of a memory read and memory write operation comprise a memory access operation. Similarly, reading or writing to processor registers, or registers in a built-in or add-on peripheral comprise access operations to those peripherals.

The terminology "platform hardware" concerns the hardware components that make up a computer system (i.e., a computer platform). These components typically include processing and memory resources, as well as various built-in resources, such as peripheral devices, clocks, interfaces, etc. In addition, the platform hardware may include add-on peripheral devices and cards.

Figure 1B:
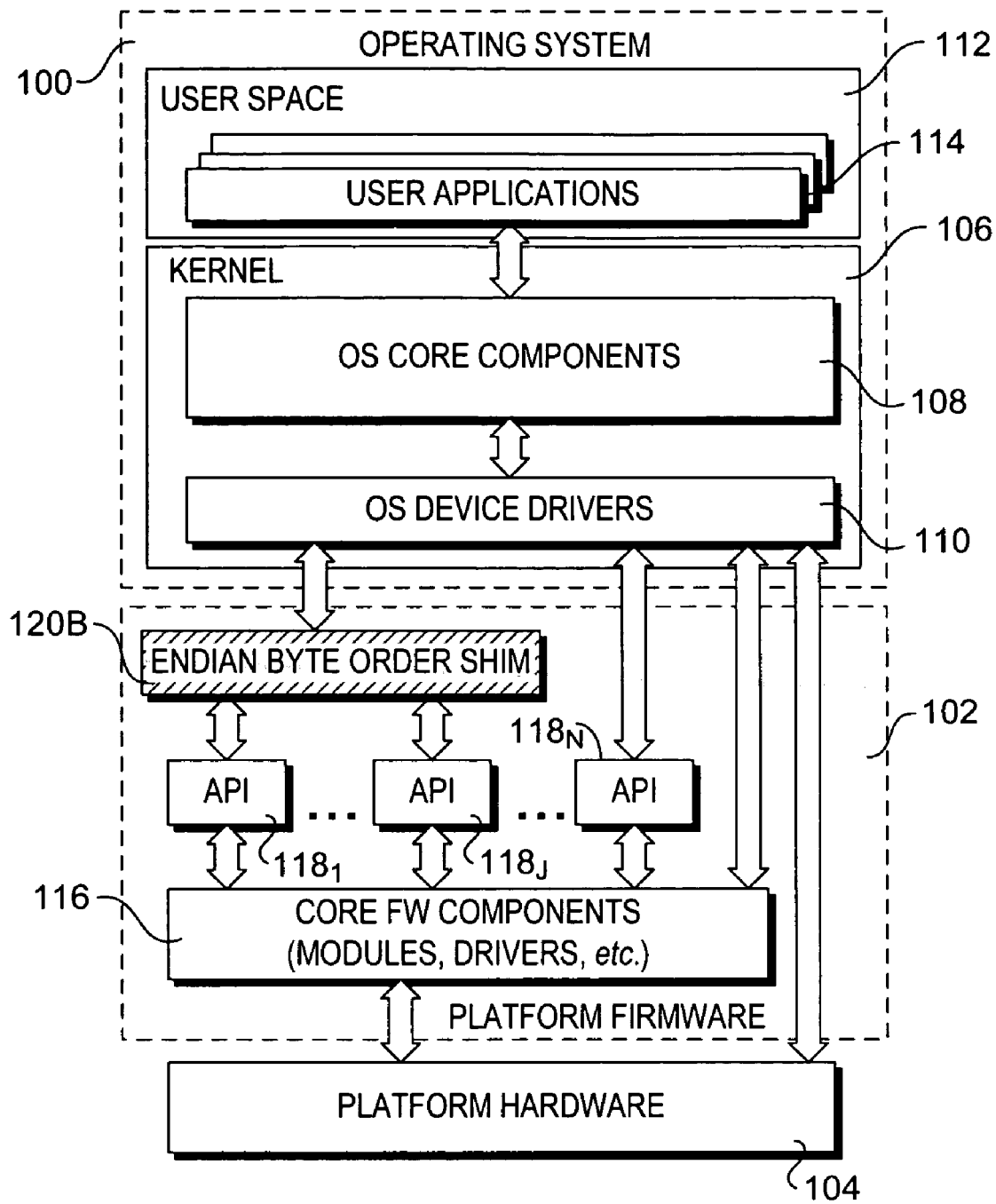

As illustrated in FIG. 1b, in some embodiments one or more APIs 100 may be accessed directly by OS device drivers 110, while an endian byte order shim 120B is employed to access other APIs. As will be evident from the discussion below, an endian byte order shim may or may not perform any operation with respect to a given API access (e.g., perform byte order reversal on passed parameters), depending on the context of the access and the pertinent endianconsiderations.

Figure 2A:
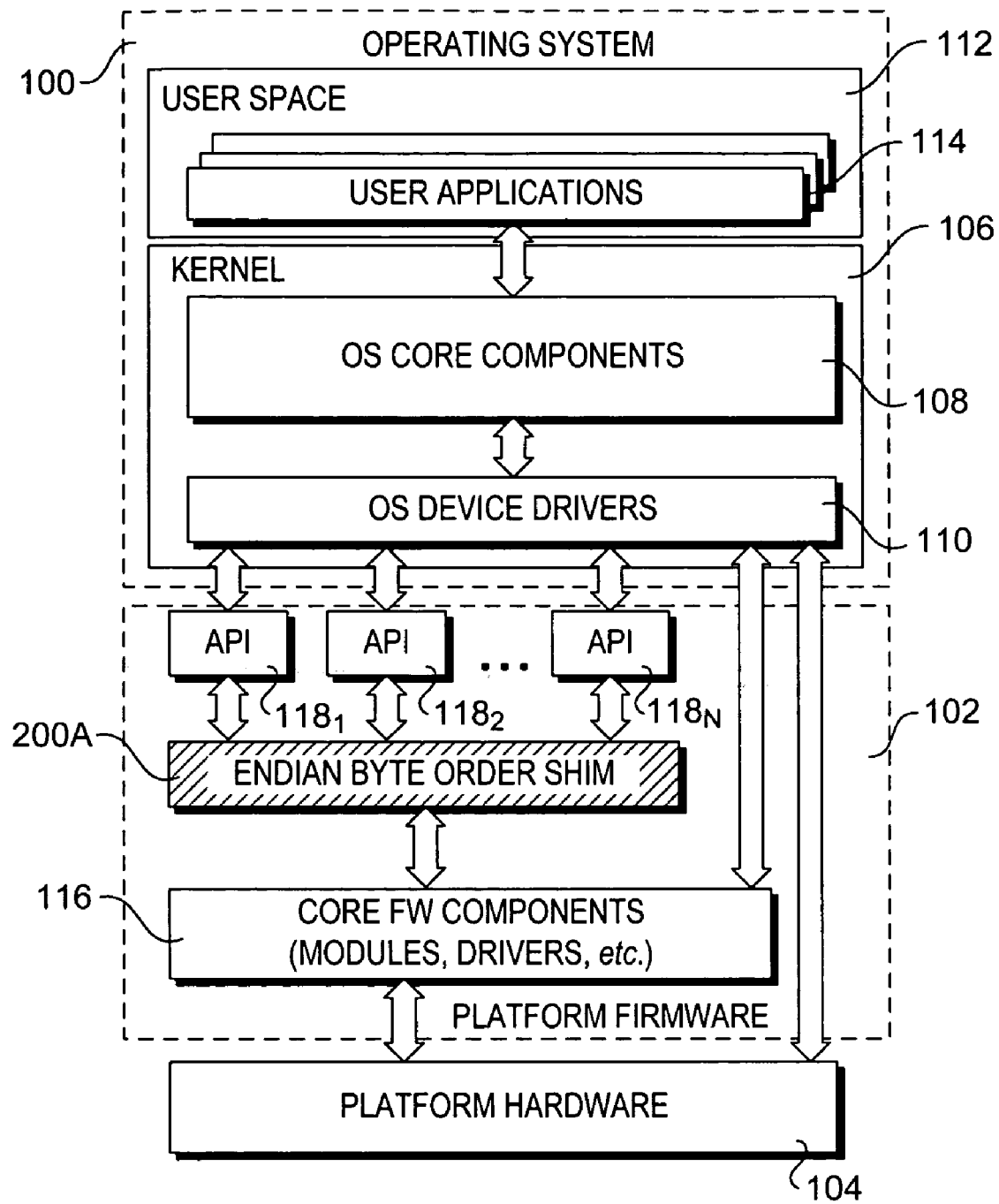
FIGS. 2a and 2b are schematic block diagrams illustrating respective embodiments of firmware architectures employing an endian byte order shim that sits between a firmware API layer and a firmware core components layer.
Figure 2B:
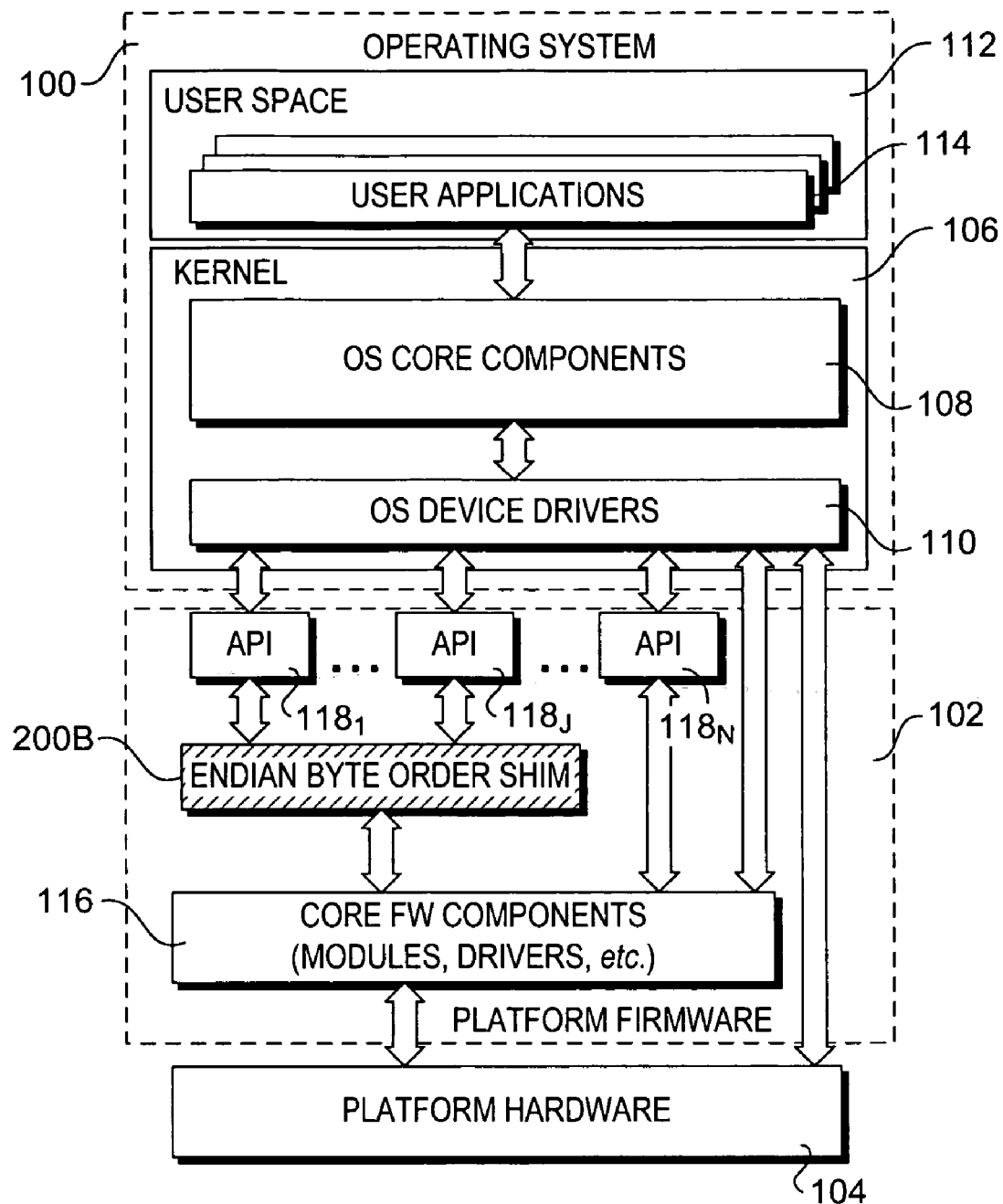

In the embodiments of FIGS. 2a and 2b, respective endian byte order shims 200A and 200B are disposed between the firmware API layer (i.e., APIs $118_N$) and the core firmware components 116. As shown in the embodiment of FIG. 2b, one or more APIs (depicted as API $118_N$) may directly access firmware core components 116. In a manner analogous to that shown in FIGS. 1a-b, in some instances OS device drivers 110 may directly access core firmware components 116 and/or platform hardware 104.

Figure 3:
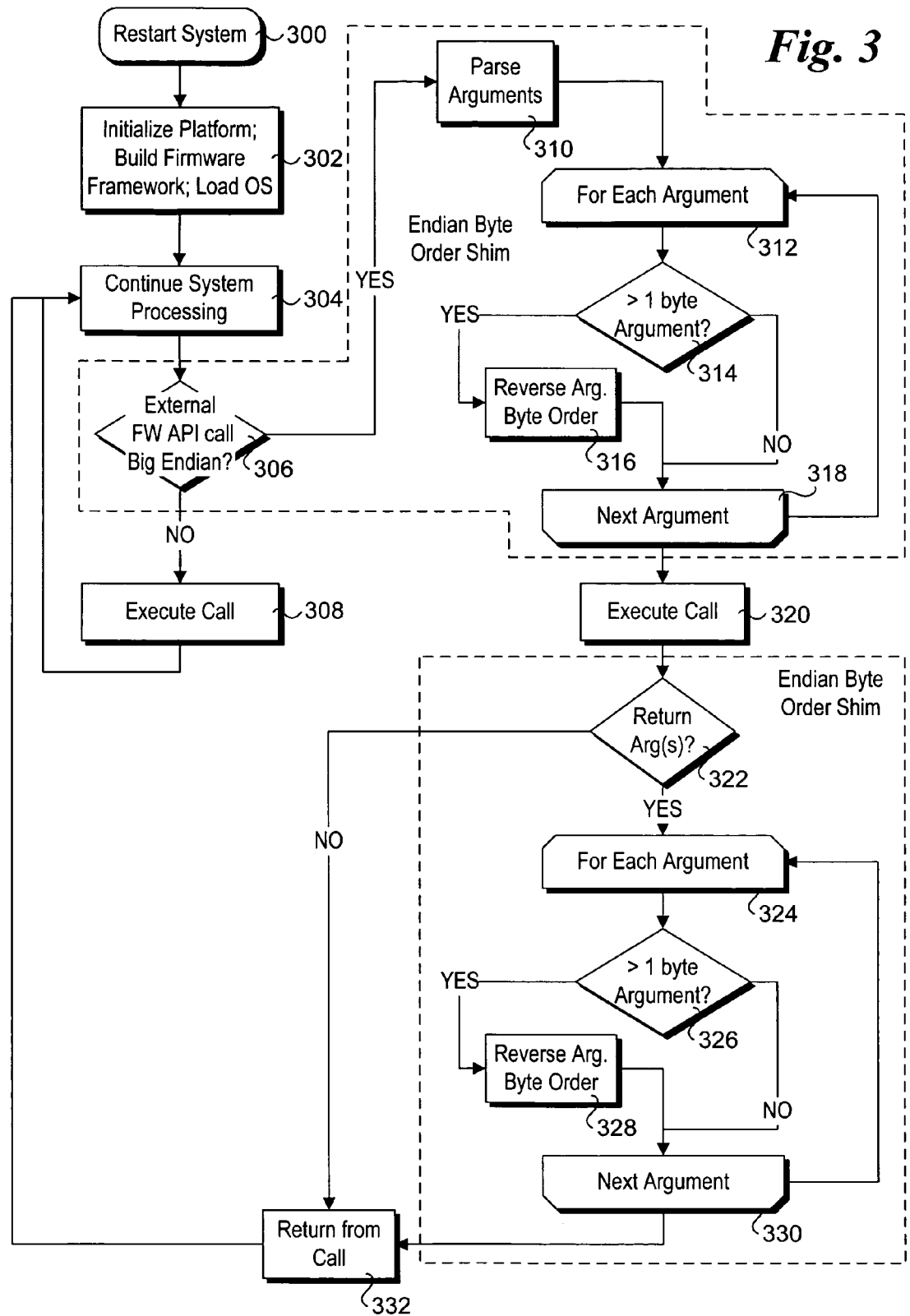
FIG. 3 is a flowchart illustrating operations and logic to facilitate compatibility between software employing a big endian format and firmware employing a little endian format, according to one embodiment of the invention.

FIG. 3 shows a flowchart illustrating operations and logic performed in conjunction with implementation of an endian byte order shim to facilitate endian consistency and compatibility in accordance with one embodiment. It is presumed in the following discussion that the operating system employs big-endian format for native data storage, while the underlying processor employs little-endian format. However, it shall be appreciated that this is merely illustrative of one possible combination. Similar operations and logic may be employed to support other combinations, such as a little-endian operating system running on a big-endian processor.

The operations begin in a block 300, with a system reset or restart 300. In response, the platform (i.e., computer system) is initialized in a block 302. During this process, a firmware framework is built to implement the endian byte order shim in accordance with one of the firmware architectures depicted in FIGS. 1a-b and 2a-b. Further details of one embodiment of this process are discussed below. After the firmware framework is built, the operating system is booted, and OS run-time operations commence, as depicted by "Continue System Processing" in a block 304.

During ongoing system processing operations, various external firmware API calls will be made by the operating system, such as via an OS device driver 110. In response, in a decision block 306 a determination is made to whether the firmware API call passes big endian-formatted data to and/or from the callee. (In the generic implementation, a decision block similar to block 306 would be employed to determine whether the call passes data having a different endian format than that either native to the underlying processor or currently employed by a bi-endian processor.) If the answer is NO, the call is executed in the normal manner in a block 308, and the logic is returned to block 304 to continue system processing.

If the answer to decision block 306 is YES, the logic proceeds to a block 310 in which the arguments are passed. Generally, zero or more arguments will be passed with the call, either directly, using a pointer to the location of the arguments, or via a call stack or the like containing a set of parameters (i.e., argument values). As indicated by start and end loop blocks 312 and 318, the following operations of decision block 314 and block 316 are then performed on each argument.

In decision block 314, a determination is made to whether the argument is greater than one byte. If it is, the byte order of the argument is reversed in block 316. This converts the format from big endian to little endian. If the argument is only a single byte, there is no need to reverse the bite order. After reversal of the byte order of all applicable arguments has been completed, the arguments are passed to the called function, which is executed in a block 320.

FIG. 4 shows a set of arguments (Args) 400A having an initial big-endian format that are converted into arguments 400B having a little-endian format. Since Arg 1 in only a single byte in length, there is no conversion performed. However, since each of bytes Args 2-4 is a multi-byte argument, the byte order of each argument is reversed in block 316, as exemplified by the illustrated detail of Arg 4.

Upon completion of the call, the function may return zero or more arguments. Accordingly, a determination is made in a decision block 322 to whether any arguments are to be returned. If the answer is YES, the byte order of each applicable argument (i.e., arguments >1 byte in length) is reversed in a manner analogous to that discussed above, as depicted by start and end loop blocks 324 and 330, decision block 326, and block 328. The converted arguments are then returned in a block 332. If the called function returns no arguments, the logic proceeds directly to block 332. In either case, the logic returns to block 304 to process the next external firmware API call.

Native storage of data on little- and big-endian processors and their corresponding byte order reversals are illustrated in FIGS. 5, 6a and 6b. For example, FIG. 5 depicts the storage of data comprising a long integer having a decimal value of 15213 on an IA32 (Intel Architecture—32-bit) architecture processor, an Intel EMT64T architecture processor, and an IBM PowerPC processor. Each of the Intel processors employ little-endian storage, while the PowerPC processor employs big-endian storage. In the case of the EMT64T processor, a total of 8 bytes (64-bits) is allocated for a long integer, with the remaining bytes being set to 00h. In FIGS. 6Pa and 6b, the stored data respectively comprises integers having respective values of 15213 and −15213, with the later stored in two's compliment form.

In accordance with further aspects of some embodiments, the firmware byte order shim is implemented under an extensible firmware framework known as the Extensible Firmware Interface (EFI) (*Extensible Firmware Interface Specification*, version 1.10, Dec. 1, 2002). EFI enables firmware, in the form of firmware modules, such as drivers, to be loaded from a variety of different resources, including flash memory devices, option ROMs (Read-Only Memory), other storage devices, such as hard disks, CD-ROM (Compact Disk-Read Only Memory), or from one or more computer systems over a computer network. One embodiment of an implementation of the EFI specification is described in the *Intel® Platform Innovation Framework for EFI Architecture Specification—Draft for Review*, version 0.9, Sep. 16, 2003 (referred to hereafter as the "Framework"). It will be understood that embodiments of the present invention are not limited to the Framework or implementations in compliance with the EFI specification.

Figure 7:
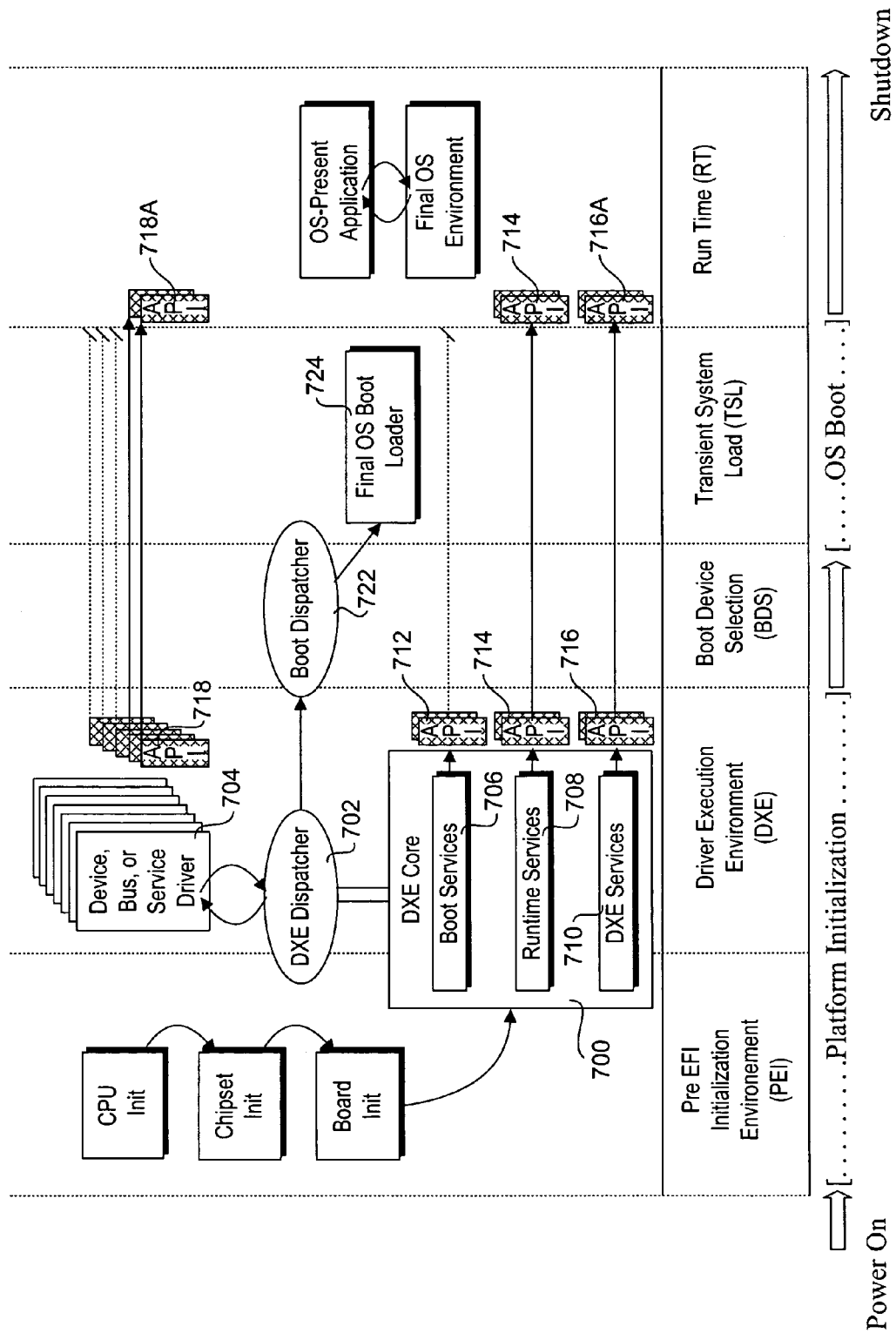
FIG. 7 is a schematic diagram illustrating the various execution phases that are performed in accordance with the extensible firmware interface (EFI) framework.

FIG. 7 shows an event sequence/architecture diagram used to illustrate operations performed by a platform under the EFI framework in response to a cold boot (e.g., a power off/on reset). The process is logically divided into several phases, including a pre-EFI Initialization Environment (PEI) phase, a Driver Execution Environment (DXE) phase, a Boot Device Selection (BDS) phase, a Transient System Load (TSL) phase, and an operating system runtime (RT) phase. The phases build upon one another to provide an appropriate run-time environment for the OS and platform.

The PEI phase provides a standardized method of loading and invoking specific initial configuration routines for the processor (CPU), chipset, and motherboard. The PEI phase is responsible for initializing enough of the system to provide a stable base for the follow on phases. Initialization of the platforms core components, including the CPU, chipset and main board (i.e., motherboard) is performed during the PEI phase. This phase is also referred to as the "early initialization" phase. Typical operations performed during this phase include the POST (power-on self test) operations, and discovery of platform resources. In particular, the PEI phase discovers memory and prepares a resource map that is handed off to the DXE phase. The state of the system at the end of the PEI phase is passed to the DXE phase through a list of position independent data structures called Hand Off Blocks (HOBs).

The DXE phase is the phase during which most of the system initialization is performed. The DXE phase is facilitated by several components, including the DXE core 700, the DXE dispatcher 702, and a set of DXE drivers 704. The DXE core 700 produces a set of Boot Services 706, Runtime Services 708, and DXE Services 710. The DXE dispatcher 702 is responsible for discovering and executing DXE drivers 704 in the correct order. The DXE drivers 704 are responsible for initializing the processor, chipset, and platform components as well as providing software abstractions for console and boot devices. These components work together to initialize the platform and provide the services required to boot an operating system. The DXE and the Boot Device Selection phases work together to establish consoles and attempt the booting of operating systems. The DXE phase is terminated when an operating system successfully begins its boot process (i.e., the BDS phase starts). Only the runtime services and selected DXE services provided by the DXE core and selected services provided by runtime DXE drivers are allowed to persist into the OS runtime environment. The result of DXE is the presentation of a fully formed EFI interface.

The DXE core is designed to be completely portable with no CPU, chipset, or platform dependencies. This is accomplished by designing in several features. First, the DXE core only depends upon the HOB list for its initial state. This means that the DXE core does not depend on any services from a previous phase, so all the prior phases can be unloaded once the HOB list is passed to the DXE core. Second, the DXE core does not contain any hard coded addresses. This means that the DXE core can be loaded anywhere in physical memory, and it can function correctly no matter where physical memory or where Firmware segments are located in the processor's physical address space. Third, the DXE core does not contain any CPU-specific, chipset specific, or platform specific information. Instead, the DXE core is abstracted from the system hardware through a set of architectural protocol interfaces. These architectural protocol interfaces are produced by DXE drivers 704, which are invoked by DXE Dispatcher 702.

Figure 8:
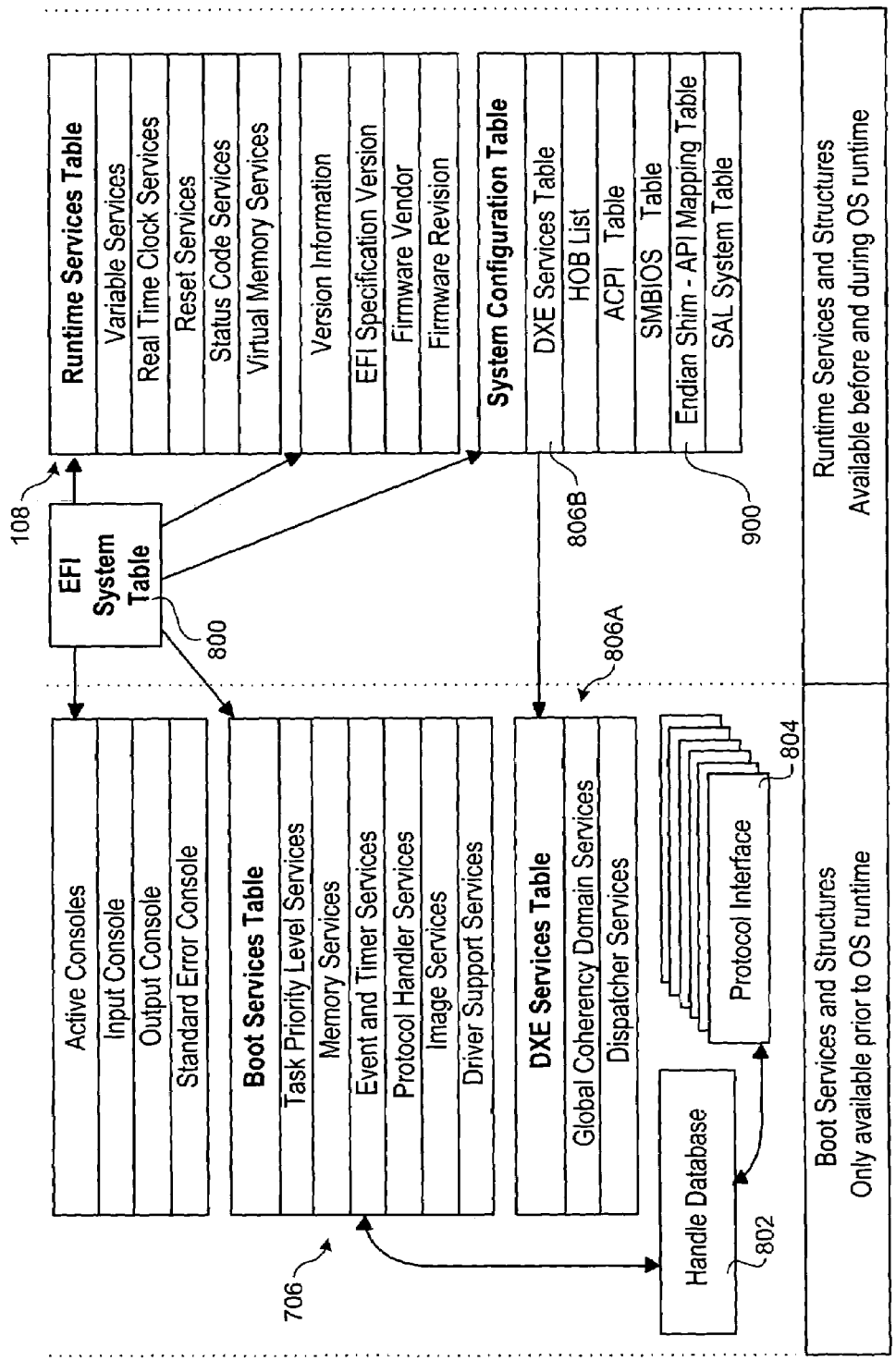
FIG. 8 is a block schematic diagram illustrating various components of the EFI system table employed by some embodiments of the invention.

The DXE core produces an EFI System Table 800 and its associated set of Boot Services 706 and Runtime Services 708, as shown in FIG. 8. The DXE Core also maintains a handle database 802. The handle database comprises a list of one or more handles, wherein a handle is a list of one or more unique protocol GUIDs (Globally Unique Identifiers) that map to respective protocols 804. A protocol is a software abstraction for a set of services. Some protocols abstract I/O devices, and other protocols abstract a common set of system services. A protocol typically contains a set of APIs and some number of data fields. Every protocol is named by a GUID, and the DXE Core produces services that allow protocols to be registered in the handle database. As the DXE Dispatcher executes DXE drivers, additional protocols will be added to the handle database including the architectural protocols used to abstract the DXE Core from platform specific details.

The Boot Services comprise a set of services that are used during the DXE and BDS phases. Among others, these services include Memory Services, Protocol Handler Services, and Driver Support Services: Memory Services provide services to allocate and free memory pages and allocate and free the memory pool on byte boundaries. It also provides a service to retrieve a map of all the current physical memory usage in the platform. Protocol Handler Services provides services to add and remove handles from the handle database. It also provides services to add and remove protocols from the handles in the handle database. Addition services are available that allow any component to lookup handles in the handle database, and open and close protocols in the handle database. Support Services provides services to connect and disconnect drivers to devices in the platform. These services are used by the BDS phase to either connect all drivers to all devices, or to connect only the minimum number of drivers to devices required to establish the consoles and boot an operating system (i.e., for supporting a fast boot mechanism).

In contrast to Boot Services, Runtime Services are available both during pre-boot and OS runtime operations. One of the Runtime Services that is leveraged by embodiments disclosed herein is the Variable Services. As described in further detail below, the Variable Services provide services to lookup, add, and remove environmental variables from both volatile and non-volatile storage. As used herein, the Variable Services is termed "generic" since it is independent of any system component for which firmware is updated by embodiments of the invention.

The DXE Services Table includes data corresponding to a first set of DXE services 806A that are available during pre-boot only, and a second set of DXE services 806B that are available during both pre-boot and OS runtime. The pre-boot only services include Global Coherency Domain Services, which provide services to manage I/O resources, memory mapped I/O resources, and system memory resources in the platform. Also included are DXE Dispatcher Services, which provide services to manage DXE drivers that are being dispatched by the DXE dispatcher.

The services offered by each of Boot Services 706, Runtime Services 708, and DXE services 710 are accessed via respective sets of API's 712, 714, and 716. The API's provide an abstracted interface that enables subsequently loaded components to leverage selected services provided by the DXE Core.

After DXE Core 700 is initialized, control is handed to DXE Dispatcher 702. The DXE Dispatcher is responsible for loading and invoking DXE drivers found in firmware volumes, which correspond to the logical storage units from which firmware is loaded under the EFI framework. The DXE dispatcher searches for drivers in the firmware volumes described by the HOB List. As execution continues, other firmware volumes might be located. When they are, the dispatcher searches them for drivers as well.

There are two subclasses of DXE drivers. The first subclass includes DXE drivers that execute very early in the DXE phase. The execution order of these DXE drivers depends on the presence and contents of an a priori file and the evaluation of dependency expressions. These early DXE drivers will typically contain processor, chipset, and platform initialization code. These early drivers will also typically produce the architectural protocols that are required for the DXE core to produce its full complement of Boot Services and Runtime Services.

The second class of DXE drivers are those that comply with the EFI 1.10 Driver Model. These drivers do not perform any hardware initialization when they are executed by the DXE dispatcher. Instead, they register a Driver Binding Protocol interface in the handle database. The set of Driver Binding Protocols are used by the BDS phase to connect the drivers to the devices required to establish consoles and provide access to boot devices. The DXE Drivers that comply with the EFI 1.10 Driver Model ultimately provide software abstractions for console devices and boot devices when they are explicitly asked to do so.

Any DXE driver may consume the Boot Services and Runtime Services to perform their functions. However, the early DXE drivers need to be aware that not all of these services may be available when they execute because all of the architectural protocols might not have been registered yet. DXE drivers must use dependency expressions to guarantee that the services and protocol interfaces they require are available before they are executed.

The DXE drivers that comply with the EFI 1.10 Driver Model do not need to be concerned with this possibility. These drivers simply register the Driver Binding Protocol in the handle database when they are executed. This operation can be performed without the use of any architectural protocols. In connection with registration of the Driver Binding Protocols, a DXE driver may "publish" an API by using the InstallConfigurationTable function. This published drivers are depicted by API's 718. Under EFI, publication of an API exposes the API for access by other firmware components. The API's provide interfaces for the Device, Bus, or Service to which the DXE driver corresponds during their respective lifetimes.

The BDS architectural protocol executes during the BDS phase. The BDS architectural protocol locates and loads various applications that execute in the pre-boot services environment. Such applications might represent a traditional OS boot loader, or extended services that might run instead of, or prior to loading the final OS. Such extended pre-boot services might include setup configuration, extended diagnostics, flash update support, OEM value-adds, or the OS boot code. A Boot Dispatcher 720 is used during the BDS phase to enable selection of a Boot target, e.g., an OS to be booted by the system.

During the TSL phase, a final OS Boot loader 722 is run to load the selected OS. Once the OS has been loaded, there is no further need for the Boot Services 706, and for many of the services provided in connection with DXE drivers 704 via API's 718, as well as DXE Services 806A. Accordingly, these reduced sets of API's that may be accessed during OS runtime are depicted as API's 716A, and 718A in FIG. 1.

In accordance with aspects of some embodiments, the pre-boot/boot framework of FIGS. 7 and 8 may be implemented to deploy an endian byte order shim in accordance with the firmware architectures of FIGS. 1*a-b* and 2*a-b*, as well as other possible firmware architectures. In the firmware architecture embodiments of FIGS. 1*a-b*, endian byte firmware shims 120A and 120B may be deployed as an EFI run-time service that is used to "intercept" API calls made to APIs $118^{1-N}$. Similarly, the firmware architecture embodiments of FIGS. 2*a-b* may also implement endian byte firmware shims 200A and 200B as an EFI run-time service. Depending on the particular invocation mechanisms, endian byte order shims 200A and 200B may be employed to transparently intercept API calls to and from core firmware components 116, or these interfaces may be configured to explicitly invoke the use of the endian byte order shims.

FIGS. 9 and 10 show respective mechanisms for invoking an endian byte order shim. Under the embodiment of FIG. 9, an endian shim-to-API mapping table 900 is stored in the EFI system configuration table of FIG. 8. Table 900 includes an entry for each of APIs $118_{1-N}$, along with a corresponding "invoke shim" value indicating whether or not the endian byte order shim is invoked in response to a call to or from that API. For example, in response to an API call 902, a lookup of endian shim-to-API mapping table 900 is performed to determine whether or not an endian byte order shim is to be invoked.

Under the embodiment of FIG. 10, the API code is stored in system memory within two address ranges. API code stored within the first address range is associated with APIs for which an endian byte order shim is to be invoked to "intercept" processing of the API. Meanwhile, access to API code stored at the second address range will not invoke the endian byte order shim, thus bypassing the shim. This mechanism may be implemented in one of several known techniques, such as using a lookup table or an address mask.

In addition to the foregoing mechanisms, other mechanisms may be implemented to invoke or bypass the use of an endian byte order shim. For example, a platform register or the like may be employed to indicate whether or not an endian byte order shim is to be invoked at a general level. Under one embodiment of this scheme, each firmware API call enunciates in interrupt that is vectored to an interrupt service routine (ISR) that performs a lookup on a platform register to see if the shim is to be invoked or not. Under one implementation, an operating system or run-time firmware service sets a logic value for the platform register to identify whether the endianness of the operating system and native (or current) endianness of the platform processor match. If they match, the ISR will immediately return to effect disabling the endian byte order shim, and the platform firmware will operate in the conventional manner. If an endianness mismatch exists, the endian byte order shim will be invoked by the ISR.

Figure 11:
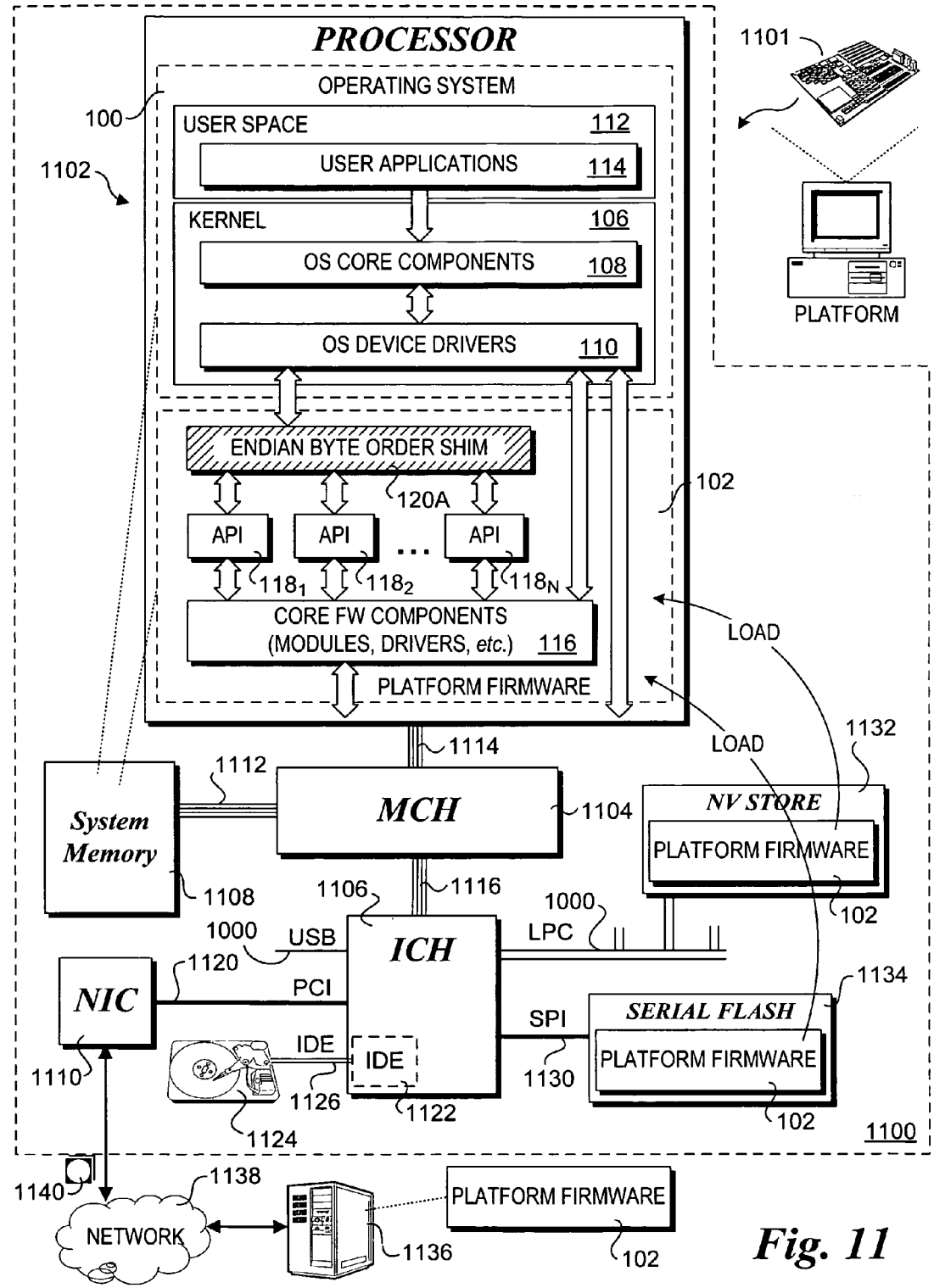
FIG. 11 illustrates an exemplary platform architecture corresponding to a computer platform on which aspects of the embodiments described herein may be practiced.

A platform architecture 1100 that may be employed to implement the system and firmware architectures disclosed herein is illustrated in FIG. 11. The platform architecture employs a motherboard or main board 1101 on which various platform hardware components are mounted, including a processor 1102, a chipset including a memory controller hub (MCH) 1104 and an input/output (I/O) controller hub (ICH) 1106, system memory 1108, and a network interface controller 1110.

MCH 1104, also commonly referred to as the "Northbridge" under PC architectures, is used to facilitate access to various system resources, including system memory 1108 via a bus 1112 and to a video subsystem via an advanced graphics port (both not shown). MCH 1104 is coupled to processor 1102 via a bus 1114 and to ICH 1106 via a bus 1116.

ICH 1106, also commonly referred to as the "Southbridge," is used to facilitate communication with various I/O ports and devices. These include a universal serial bus (USB) 1118, a PCI (Peripheral Component Interconnect) bus 1120, and an Integrated Drive Electronics (IDE) disk controller 1122 that is used to communicate with a disk drive 1124 via an IDE connector 1126. In some embodiments, ICH 1106 may host a low pin count LPC bus 1128 and/or an SPI (Serial Peripheral Interface) port 1130.

In general, platform firmware 102 may be stored in one or more storage means, either on the platform or accessible to the platform via a network. For example, FIG. 11 shows instances of platform firmware 102 being stored in a non-volatile store (e.g., flash chip) 1132 coupled to LPC bus 1128 and a serial flash chip 1134 coupled to SPI port 1130. Generally, one of these two option would be used for a given platform; both are depicted herein for the point of illustration. Under embodiments employing the EFI framework, firmware components comprising firmware volumes and the like may be stored on other types of devices, such as on a protected partition on disk drive 1124 or on a remote server 1136 that is accessed via a network 1138 and an I/O port 1140 coupled to NIC 1110.

Generally, the platform firmware component instance(s) will be loaded into system memory 1108 during platform initialization operations, with a portion of the firmware code being executed on processor 1102 to build the firmware framework. During OS boot, the various operating system 100 components will also be loaded into system memory 1108. During OS run-time, various OS and run-time firmware components will be executed on processor 1102 to effect aspects of the embodiments described above.

As discussed throughout, various operational aspects of the embodiments described herein are performed via execution of firmware instructions on a processor. Thus, embodiments of this invention may be used as or to support coded instructions executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and an NV store or the like (flash memory, serial flash chip, EEPROM, etc.)

The mechanisms described herein provide several advantages. Notably, a single platform architecture, including the underlying platform firmware, may be employed to host both little-endian and big-endian software, regardless of the native or current endianness employed by the platform hardware. Thus, a single platform architecture may be employed to host multiple operating systems, regardless of the native endian format of those operating systems. Accordingly, for example, a single platform could be employed to run both Microsoft Windows® operating systems and Apple® OS X operating systems. This would give the platform hardware added flexibility, and more market appeal.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
   implementing a mechanism to enable an operating system employing a first endian byte order to transfer data between the operating system and a platform hardware component employing a second endian byte order;
   receiving a firmware call from the operating system to access the platform hardware component, the firmware call containing at least one argument employing the first endian byte order;
   converting any arguments in the firmware call having a length of more than one byte from the first endian byte order to the second endian byte order; and
   passing the firmware call with the at least one argument and including any converted arguments to a firmware component to execute the call to access the platform hardware component.

2. The method of claim 1, further comprising:
   generating, in response to the firmware call, at least one return argument having the second endian byte order;
   converting the endian byte order of any of the at least one return argument having a length of more than one byte from the second endian byte order to the first endian byte order; and
   returning the at least one converted return argument to the operating system.

3. The method of claim 1, wherein the mechanism comprises an endian byte order shim disposed between an operating system device driver layer and a firmware core layer, and the method further comprises:
   receiving the firmware call from an operating system device driver;
   employing the endian byte order shim to convert the endian byte order of the any arguments in the firmware call having a length of more than one byte from the first endian byte order to the second endian byte order; and
   passing the converted arguments to a firmware core component.

4. The method of claim 3, further comprising:
   employing a mechanism to determine whether to intercept the firmware call to have any arguments in the firmware call converted by the endian byte order shim prior to passing the call to the firmware core component.

5. The method of claim 4, wherein the mechanism determines whether to intercept the firmware call based on a firmware application program interface (API) referenced by the firmware call.

6. The method of claim 3, wherein the endian byte order shim is disposed between an operating system device driver layer and a firmware application program interface (API) layer that sits above the firmware core layer, and the method further comprises:
   receiving a firmware call from an operating system device driver referencing a firmware API;
   employing the endian byte order shim to convert the endian byte order of the any arguments in the firmware call having a length of more than one byte from the first endian byte order to the second endian byte order; and
   passing the converted arguments to the firmware API.

7. The method of claim 3, wherein the endian byte order shim is disposed between a firmware application program interface (API) layer that sits below an operating system device driver layer and the firmware core layer, and the method further comprises:
   receiving a firmware call from an operating system device driver referencing a firmware API;
   passing the call to the firmware API;
   generating a firmware core call via the API;
   employing the endian byte order shim to convert the endian byte order of the any arguments in the firmware core call having a length of more than one byte from the first endian byte order to the second endian byte order; and
   passing the converted arguments to the firmware core layer.

8. The method of claim 1, further comprising:
   detecting whether the operating system running on the platform hardware component employs the same or different endianness of a current mode of the platform hardware component; and if the the operating system employs the same endianness as the current mode of the platform hardware component, passing data having an endian byte order between the operating system and the platform firmware without converting the endian byte order of the data.

9. The method of claim 1, further comprising:
   implementing the mechanism in a manner that is transparent to the operating system.

10. A machine-readable storage medium having stored thereon instructions when executed on a platform processor that accesses platform hardware components using a first endian byte order, perform operations comprising:
    enabling software employing a second endian byte order to transfer data between the software and the platform hardware components employing the first endian byte order, wherein the instructions are embodied as an endian byte order shim to convert endianness of the data having a length of more than one byte between the first and second endian byte orders, wherein the endian byte order shim comprising a portion of platform firmware that sits below an operating system layer and above a firmware core component layer in a platform software/firmware stack.

11. The machine-readable storage medium of claim 10, further comprising instructions to be executed to build a firmware framework via which the endian byte order shim is implemented.

12. The machine-readable storage medium of claim 10, wherein execution of the instructions performs further operations comprising:

intercepting a firmware call from the software to access a platform hardware component, the firmware call containing at least one argument employing the second endian byte order;

converting any arguments in the firmware call having a length of more than one byte from the second endian byte order to the first endian byte order; and passing the firmware call with the at least one argument and including any converted arguments to a firmware component to execute the call to access the platform hardware component.

13. The machine-readable storage medium of claim 10, wherein execution of the instructions performs further operations comprising:

intercepting a firmware call return generated in response to a firmware call submitted by an operating system component to access a platform hardware component, the firmware call return containing at least one argument employing the first endian byte order;

converting any arguments in the firmware call return having a length of more than one byte from the first endian byte order to the second endian byte order; and returning the firmware call return with the at least one argument and including any converted arguments to the operating system component.

14. A computer platform, comprising:

a main board to which a platform hardware is mounted and communicatively-coupled, including, a processor having a native execution mode employing a little endian byte order;

a chipset, including a memory controller hub (MCH) and an input/output controller hub (ICH);

memory, coupled to the MCH; and a firmware storage device, coupled to the ICH, having firmware stored therein to be loaded into the memory and executed on the processor to perform operations comprising, implementing a mechanism to enable an operating system employing either a big endian byte order or a little endian byte order to transfer data to and receive data from the platform hardware, wherein the mechanism employs an endian byte order shim that is implemented within an Extensible Firmware Interface (EFI) framework under which the endian byte order shim is disposed between an operating system device driver layer and a firmware core component layer.

15. The computer platform of claim 14, wherein the mechanism operates in a manner that is transparent to the operating system.

\* \* \* \* \*